US006188593B1

(12) United States Patent
Gruwe

(10) Patent No.: US 6,188,593 B1
(45) Date of Patent: Feb. 13, 2001

(54) SYNCHRONOUS RECTIFYING FLYBACK CONVERTER WITH VARIABLE INPUT AND OUTPUT VOLTAGES

(75) Inventor: Alain Gruwe, Brussels (BG)

(73) Assignee: Alcatel, Paris (FR)

( * ) Notice: Under 35 U.S.C. 154(b), the term of this patent shall be extended for 0 days.

(21) Appl. No.: 09/514,321

(22) Filed: Feb. 28, 2000

(30) Foreign Application Priority Data

Mar. 29, 1999 (EP) ................................................. 99400767

(51) Int. Cl.[7] ................................................. H02M 7/217
(52) U.S. Cl. ................................................. 363/127
(58) Field of Search ................................. 36/125, 127

(56) References Cited

U.S. PATENT DOCUMENTS

| 3,735,235 | * | 5/1973 | Hamilton et al. | 363/26 |
| 4,399,499 | * | 8/1983 | Butcher et al. | 363/17 |
| 5,870,299 | * | 2/1999 | Rozman | 363/127 |
| 6,069,799 | * | 5/2000 | Bowman et al. | 363/20 |
| 6,072,701 | * | 6/2000 | Sato et al. | 363/17 |

FOREIGN PATENT DOCUMENTS

| 37 27 170 A1 | 2/1989 | (DE) . |
| WO 95/02917 | 1/1995 | (WO) . |

* cited by examiner

*Primary Examiner*—Adolf Deneke Berhane
(74) *Attorney, Agent, or Firm*—Sughrue, Mion, Zinn, Macpeak & Seas, PLLC

(57) ABSTRACT

A synchronous rectifying converter for variable input/output voltages and adapted to operate at both low voltages and large input/output voltage ranges. The converter includes a transformer with a main secondary winding (MSW) coupled to the output via a controlled electronic switch (CES) and a control secondary winding (CSW) for controlling the switch. The control secondary winding is connected to the junction point of the series connection of a diode (DD) and a capacitor (CP2) coupled across the main secondary winding. If the two secondary windings (MSW, CSW) have a same number of turns, the 'off' control voltage of the switch is zero, independently of the input voltage and the output voltage of the converter, whilst the 'on' control voltage is practically not influenced by the output voltage.

19 Claims, 1 Drawing Sheet

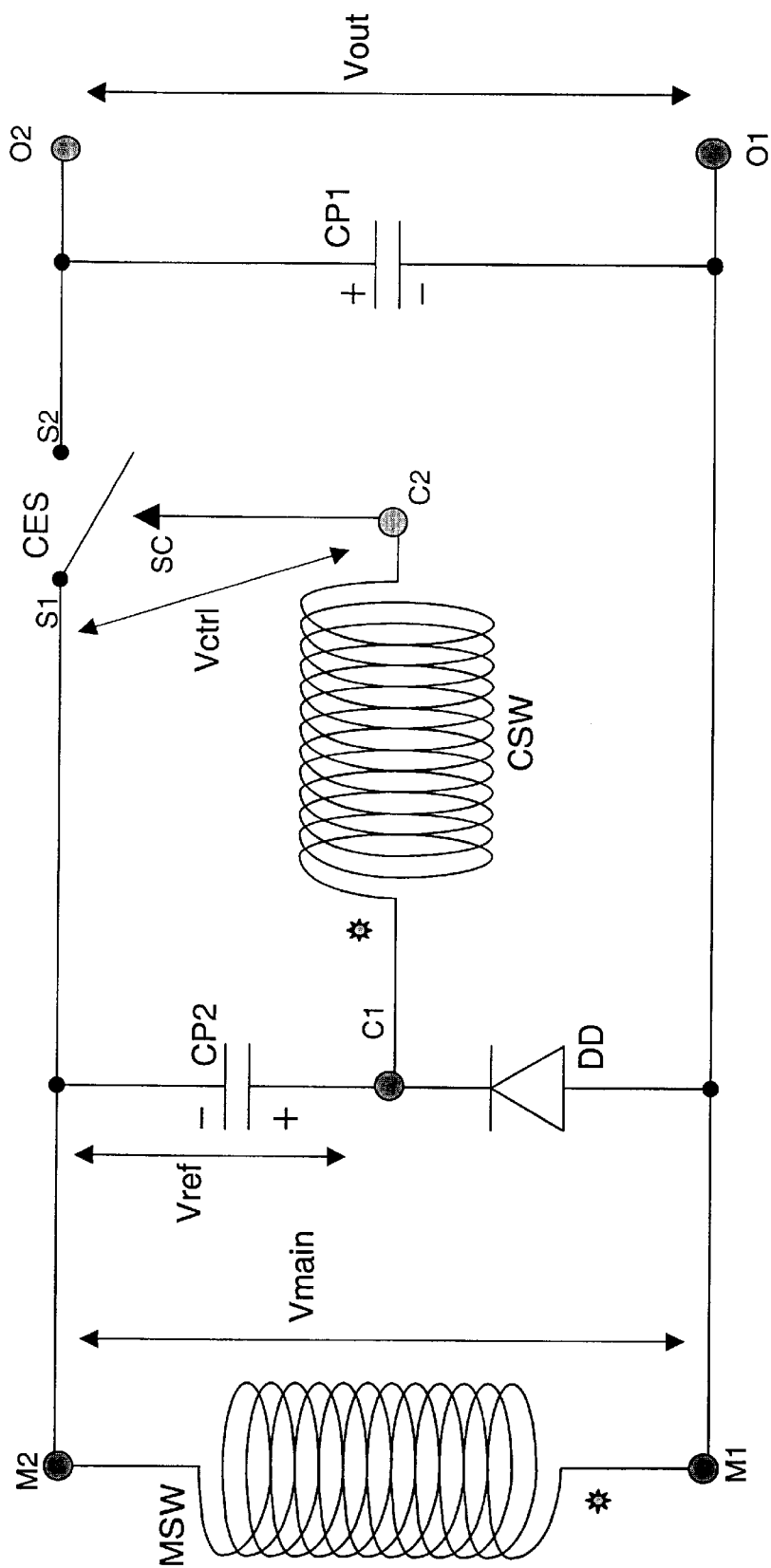

SYNCHRONOUS RECTIFYING FLYBACK CONVERTER WITH VARIABLE INPUT AND OUTPUT VOLTAGES

BACKGROUND OF THE INVENTION

The present invention relates to a voltage converter with a variable input and output and including transformer means from the secondary winding of which a dc voltage is derived.

A converter of that type is already known in the art. Therein, the secondary winding of the transformer means is generally coupled to the output via a diode, whilst a capacitor is connected across this output. In this known converter, the voltage drop across the diode leads to significant reduction of the converter efficiency. This is particularly true for low output voltage application and is not acceptable for applications where the efficiency is a critical parameter as for instance a Solid State Power Amplifier (SSPA) which is an essential element of any telecommunication satellite payload that amplifies the RF signal and sends it to the antenna.

To overcome the poor efficiency of the known diode-rectifying converter, synchronous rectifying converters are used.

Therefore, the present invention more particularly relates to a synchronous rectifying converter with a variable input and output, said converter including transformer means having a main secondary winding and a control secondary winding, said main secondary winding having a first main terminal coupled to a first output terminal of said converter, and a second main terminal coupled via a controlled electronic switch to a second output terminal of said converter, and said control secondary winding having a first control terminal coupled to said main secondary winding, and a second control terminal coupled to a control input terminal of said switch, a capacitor being coupled between the first and the second output terminal of said converter.

Such a synchronous rectifying converter using a controlled electronic switch instead of a diode is also already known in the art. The advantage with respect to the diode-rectifying converter is that it presents a smaller voltage drop at the cost of an additional control secondary winding used to control the electronic switch. However, the field of applications of the synchronous rectifying converter is more restricted than that of the diode-rectifying converter. Indeed, the output voltage range of the synchronous rectifying converter is linked to the maximum acceptable 'on' and 'off' voltages provided by the secondary control winding. The 'on' control voltage provided to the switch is proportional to the output voltage of the converter, i.e. to the voltage provided at the main secondary winding, whilst on the other hand, the 'off' control voltage provided to the switch is negative and proportional to the input voltage of the converter, i.e. to the voltage at the primary winding of the transformer. Hence, the input and output voltages of the converter have direct impacts on the control voltage range provided by the control secondary winding which becomes generally incompatible for operating the electronic switch.

SUMMARY OF THE INVENTION

An object of the present invention is to improve, preferably at low cost, the synchronous rectifying converter of the above known type by increasing its input and output voltage operating ranges.

According to the invention, this object is achieved due to the fact that said converter further includes, between said first main terminal and said second main terminal of said main secondary winding, the series connection of a diode and a second capacitor, and that said first control terminal of said control secondary winding is connected to the junction point of said diode with said second capacitor.

In this way, a reference voltage is generated across the second capacitor, and the control secondary winding is referred on this reference voltage, at the junction point between the diode and the second capacitor. In function of the ratio of the number of turns between the main and the control secondary windings, the 'off' control voltage may be adjusted to a predetermined value, e.g. zero, and be independent from the input voltage and the output voltage of the converter. The 'on' control voltage is given by the summation of the reference voltage and the voltage across the control secondary winding. The influence of the output voltage of the converter on the control voltage of the switch is thereby limited. This is particularly advantageous for low voltages. As a result, the variations of the control voltage with respect to the input and output voltages of the converter are relatively much lower than the one obtained with the known standard synchronous rectifying converter. The present converter is thus able to work at relatively larger input/output voltage ranges.

Since only a diode and a second capacitor have been added to the known standard synchronous rectifying converter, the complexity and the number of components of the converter of the invention have not dramatically increased and remain acceptable for almost all the possible applications.

Additionally, it is to be noted that the performances of the present synchronous rectifying converter may be optimized by a suitable adjustment of the number of turns of the control winding.

In more detail, the present invention is characterized in that said diode is forward biased between said first main terminal of said main secondary winding and said first control terminal of said control secondary winding.

In this way, the voltage across the control secondary winding is referred on a reference voltage that is generated by a forward auxiliary rectifying on the main secondary winding.

The present invention is further also characterized in that said first main terminal of said main secondary winding and said first control terminal of said control secondary winding have the same bias polarity.

The signals then have simultaneously a same polarity at these two terminals.

In a preferred embodiment, said main secondary winding and said control secondary winding have a same number of turns.

It can be proved that generally the best performances are so obtained.

Further characteristic features of the present synchronous rectifying converter are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawing whereof the FIGURE shows a synchronous rectifying converter according to the invention.

DETAILED DESCRIPTION OF THE INVENTION

The synchronous rectifying converter, also called "synchronous rectifying flyback converter" shown in the FIGURE is adapted to operate with variable input and output voltages. It comprises a source (not shown), generally a dc source, coupled to the primary winding (not shown) of a transformer. The secondary winding of the transformer, hereafter called main secondary winding MSW, is coupled to the output of the converter via rectifying means and a capacitor CP1 is provided between a first O1 and a second O2 terminals of the output.

In more detail, the main secondary winding MSW has a first bias reference terminal M1 that is directly connected to the first output terminal O1 of the converter. The second terminal M2 of the main secondary winding MSW is coupled to the second output terminal O2 of the converter via a controlled electronic switch CES. The controlled electronic switch CES is preferably a MOSFET transistor of which the source or first terminal S1 is connected to the second main terminal M2, whilst the gate or second terminal S2 is connected to the second output terminal O2.

The secondary circuit of the converter further comprises the series connection of a forward biased diode DD and a second capacitor CP2, connected between the first M1 and the second M2 terminals of the main secondary winding MSW.

The transformer is further provided with an additional control secondary winding CSW of which a first bias reference terminal C1 is connected to the junction point between the diode DD and the capacitor CP2. The second terminal C2 of the control secondary winding CSW is connected to a control terminal SC of the electronic switch CES, e.g. the gate terminal of the MOSFET transistor. It is to be noted that signals simultaneously have a same polarity at the first main terminal M1 and at the first control terminal C1.

The output voltage Vout of the converter is proportional to the voltage Vmain at the main secondary winding of the transformer that is itself proportional to the voltage of the dc source.

Although it is obvious that the relation between the number of turns of the main secondary winding MSW and the number of turns of the control secondary winding CSW may be adjusted in order to optimize the performances of the converter, it will be considered in the following example of embodiment that the main and the control secondary windings have the same number of turns. The voltage Vmain at the main secondary winding MSW is thus equal to the voltage across the control secondary winding CSW.

During a first phase of the voltage Vmain, the terminal M2 is negatively biased with respect to the terminal M1, so that the diode DD is conductive. As a result, the capacitor CP2 is loaded at a voltage Vref. This voltage Vref is equal to the voltage Vmain during its first phase, that is the input voltage times the turn ratio between the main secondary winding MSW and the primary winding. During this irst phase, the voltage across the control secondary winding CSW is also equal to the voltage Vmain, so that the terminal C2 is negatively biased with respect to the terminal C1. In consequence, the voltage Vctrl, which is equal to the sum of Vref and the voltage across the control secondary winding CSW, is equal to zero volt. This corresponds to the 'off' control voltage of the switch. The 'off' control voltage is thus independent from the input voltage and the output voltage of the converter.

During the second phase of the voltage Vmain, the terminal M2 is positively biased with respect to the terminal M1, so that the diode DD is blocked. The second capacitor CP2, storing the main voltage Vmain since the first phase, is discharged very slowly through the control secondary winding CSW and the high input impedance of the control input terminal SC of the switch CES, i.e. the gate of the MOSFET transistor mentioned above. During this second phase, the voltage across the control secondary winding CSW is equal to the Vmain voltage and so substantially equal to the output voltage Vout. In consequence, the voltage Vctrl is equal to the sum of Vref and Vout. This corresponds to the 'on' control voltage of the switch CES. The influence of the input voltage and the output voltage on the 'on' control voltage of the switch CES is still present but limited. This is particularly true for low output voltage applications. As a result, the present converter suits well both for low voltages and for large input/output voltage ranges.

In a possible variant of the present embodiment, and in order to achieve better performances of the converter, a slightly negative 'off' voltage can be obtained by slightly increasing the number of turns of the control secondary winding CSW with respect to the number of turns of the main secondary winding MSW.

While the principles of the invention have been described above in connection with specific apparatus, it is to be clearly understood that this description is made only by way of example and not as a limitation on the scope of the invention, as defined in the appended claims.

What is claimed is:

1. A synchronous rectifying converter with a variable input and output, said converter including transformer means having a main secondary winding and a control secondary winding, said main secondary winding having a first main terminal coupled to a first output terminal of said converter, and a second main terminal coupled via a controlled electronic switch to a second output terminal of said converters, and said control secondary winding having a first control terminal coupled to said main secondary winding, and a second control terminal coupled to a control input terminal of said switch, a first capacitor coupled between the first output terminal and the second output terminal of said converter, said converter further comprising, between said first main terminal and said second main terminal of said main secondary winding, a diode and a second capacitor coupled in series, and said first control terminal of said control secondary winding is coupled to junction of said diode with said second capacitor.

2. The synchronous rectifying converter according to claim 1, wherein said diode is forward biased between said first main terminal of said main secondary winding and said first control terminal of said control secondary winding.

3. The synchronous rectifying converter according to claim 1, wherein said first main terminal of said main secondary winding and said first control terminal of said control secondary winding have the same bias polarity.

4. The synchronous rectifying converter according to claim 1, wherein said main secondary winding and said control secondary winding have a substantially same number of turns.

5. The synchronous rectifying converter according to claim 1, wherein said controlled electronic switch comprises a MOSFET transistor.

6. A synchronous rectifying converter configured for receiving a variable input and generating a variable output, comprising:

a main secondary winding having a first main terminal coupled to a first output terminal and a second main terminal coupled through a switching device to a second output terminal;

a current storage device and a rectifier coupled in series between the first main terminal and the second main terminal of said main secondary winding; and a control circuit responsive to a voltage at a connection point between said current storage device and said rectifier to provide a control signal to said switching device.

7. The synchronous rectifying converter of claim 6, wherein said current storage device is a capacitor.

8. The synchronous rectifying converter of claim 6, wherein said control circuit is a control secondary winding having a first control terminal that comprises said connection point and a second control terminal coupled to a control input terminal of said switching device.

9. The synchronous rectifying converter of claim 8, wherein said rectifier is a diode.

10. The synchronous rectifying converter of claim 8, wherein said switching device is a transistor having a first electrode coupled to the second main terminal, a second electrode coupled to the second output terminal, and a control electrode that is said control input terminal, coupled to the second control terminal.

11. The synchronous rectifying converter of claim 8, wherein the main secondary winding and the control secondary winding have a substantially identical number of turns.

12. The synchronous rectifying converter of claim 8, wherein the control secondary winding has a substantially larger number of turns than the main secondary winding.

13. The synchronous rectifying converter of claim 8, wherein said rectifier is forward biased between said first main terminal and said first control terminal.

14. The synchronous rectifying converter of claim 8, wherein said first main terminal and said first control terminal have the same bias polarity.

15. A method for increasing input and output voltage operating ranges of a synchronous rectifying voltage converter, comprising:

generating a main voltage at a main secondary winding having a first main terminal coupled to a first output terminal and a second main terminal coupled to a switching device, the switching device being coupled to a second output terminal;

generating a reference voltage at a first current storage device coupled in series with a rectifier between said first main terminal and said second main terminal;

generating a control voltage between a switch control terminal of the switching device and a control secondary winding, said control secondary winding having a first control terminal commonly coupled to said rectifier and said first current storage device and a second control terminal coupled to said switch control terminal; and generating an output voltage, said output voltage regulated by a second current storage device.

16. The method of claim 15, wherein the second main terminal is negatively biased with respect to the first main terminal, said rectifier is a conductive diode, said first current storage device is a capacitor that stores a current from said rectifier, and the reference voltage is substantially equal to the main voltage.

17. The method of claim 16, wherein the second control terminal is negatively biased with respect to the first control terminal, the control voltage substantially equals zero and said switching device is transited to an 'off' position.

18. The method of claim 15, wherein the second main terminal is positively biased with respect to the first main terminal, said rectifier is blocked, and said first current storage device is a capacitor that discharges current through said control secondary winding.

19. The method of claim 18, wherein said control voltage is substantially equal to a sum of the reference voltage and the output voltage, and said switching device is transited to an 'on' position.

* * * * *